PLURAL TUNER ASSEMBLY

Filed Feb. 10, 1966 2 Sheets-Sheet 1

INVENTOR
James A. Fisher
BY R. Lewis Gable
ATTORNEY 3,370,473
PLURAL TUNER ASSEMBLY James A. Fisher, Metuchen, N.J., assignor to Westinghouse Electric Corporation, Pittsburgh, Pa., a corporation of Pennsylvania Filed Feb. 10, 1966, Ser. No. 526,468
10 Claims. (Cl. 74—10.45)

This invention relates to television receivers, and more particularly to tuner assemblies capable of tuning such television receivers through the very high and ultra-high frequency bands.

Under the requirements of the Federal Communications Commission, present day television receivers are required to have tuners capable of receiving signals of a very high and an ultra-high frequency band. Typically, the tuner assembly must be able to select and also to fine tune each of the channels 2 to 13 within the very high frequency band and also to provide means for tuning the channels 14 to 83 in the ultra-high frequency band. Many problems have been created in trying to provide a television receiver that may be tuned for both the very high and ultra-high frequency bands without undue manual switching or other adjusting operations.

First, it is necessary to provide a visual indication of which frequency band, and which channel within the selected frequency band to which the tuner assembly is adjusted. One tuner assembly arrangement, which facilitates the easy identification of the selected channel, provides a window or other viewing section through which appropriate indicia may be viewed. Such an arrangement has the advantage that the viewer of the television receiver may easily identify the channel to which the receiver is adjusted by merely looking at the window. In other arrangements where the indicia corresponding to each of the channels are placed upon a selector element, there may be some difficulty in identifying one of many numerals which represents the channel to which the receiver is tuned. Thus, where only one of many numerals is prominently displayed as through a viewing section, the viewer may easily identify that channel to which he is tuned. However, where there are twelve channels in the very high frequency band and 70 channels within the ultra-high frequency, many problems are presented in displaying only one of the numerals corresponding to a particular channel and in indicating which of the two frequency bands the tuner assembly is adjusted.

Typically, tuner assemblies include separate drive means for selecting the channels in each of the frequency bands. It is also desirable that a separate means be provided to fine tune each of the channels in the very high frequency band. Further, tuner assemblies normally include mechanical means such as a knob and appropriate linkages for selecting and fine tuning the channels in both the VHF and UHF frequency bands, and appropriate linkage means associated with dials for displaying the indicia corresponding to the channels in the various frequency bands.

It is, therefore, an object of the present invention to provide a new and improved tuner assembly that includes a tuning unit for the very high frequency band and a tuning unit for the ultra-high frequency band.

Another object of this invention is to provide an improved tuner assembly capable of tuning channels in two frequency bands that may be operated with the minimum of actuating components and mechanical linkages.

A still further object of this invention is to provide an improved tuner assembly whereby the sets of indicia corresponding to the channels of two frequency bands are prominently displayed.

Briefly, the present invention accomplishes the abovementioned objects by providing a tuner assembly having first and second tuner units capable of tuning channels in different frequency bands, such as the very high frequency band and the ultra-high frequency band. Further, first and second indicator dials bearing indicia corresponding to the channels in each of the frequency bands are mechanically linked to the respective tuning units and are so disposed with respect to each other that the indicia of the second indicator dial appears through a viewing section or window in the first indicator dial. More specifically, the tuner assembly of this invention includes a first drive shaft, a second drive shaft mounted concentrically about the first drive shaft, and a linkage assembly disposed upon said first drive shaft so as to be rotatable therewith. Further, the linkage assembly supports the first indicator dial and also is adapted to apply a rotational force to the second drive shaft as well as to allow the first drive shaft to be rotated while maintaining fixed the position of the second drive shaft.

In an illustrative embodiment of this invention, the linkage assembly includes at least a pair of planetary gears having the same effective pitch circle and a shaft interconnecting the planetary gears which is mounted so as to rotate with the first drive shaft. A first sun gear is associated with the second drive shaft so as to be rotated by one of the planetary gears. Another sun gear having an effective pitch circle equal to that of the first sun gear is disposed so as to impart a rotational motion to the other of the planetary gears.

These and other objects and advantages of the present invention will become more apparent when considered in view of the following detailed description and drawings in which.

Figure 1:
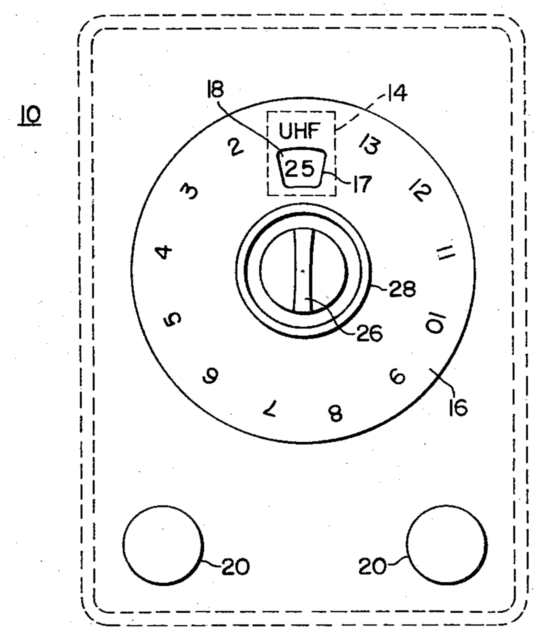
FIGURE 1 is a view in front elevation of an escutcheon for displaying the indicia of the tuner assembly of this invention.
Figure 2:
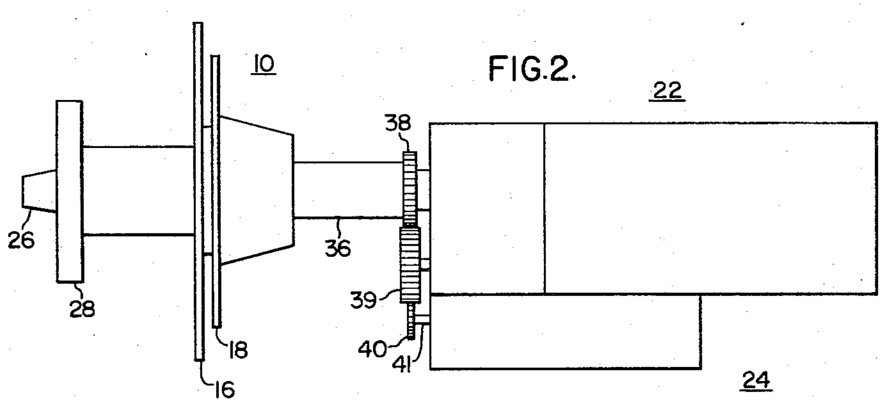
FIG. 2 is a plan view of the tuner assembly of this invention including the first and second tuner units thereof.

Referring to the drawings and in particular to FIG. 1, there is shown a tuner assembly 10 having provision for tuning channels in the very high frequency and the ultra-high frequency bands. An escutcheon 12 (as shown in dotted line) is disposed in front of the tuner assembly and provides a viewing section such as window 14 within the escutcheon 12 through which the indicia upon a pair of indicating dials 16 and 18 may be viewed. As shown in FIG. 2, the tuner assembly 10 includes a tuning unit 22 for the very high frequency band and a tuning unit 24 for the ultra-high frequency band. The indicator dial 16 is associated with the VHF tuning unit 22 and has indicia thereon including the numerals 2 to 13 corresponding to the broadcast channels in the very high frequency band. The UHF indicator dial 18 likewise has indicia thereon representing the broadcast channels 14 to 83 within the ultra-high frequency band. Further, the VHF indicator dial 16 has a window 17 therein through which the indicia upon the UHF indicator dial 18 may appear. A plurality of adjustment knobs 20 for making other required adjustments to the television receiver are also provided. A selector knob 26 is associated with the VHF tuning unit 22 for individually selecting each of the channels 2 through 13. A dual purpose actuator knob 28 is disposed concentrically about the selector knob 26 and serves, as will be explained in detail later, to fine tune the channels 2 to 13 within the very high frequency band and also to select the broadcast channels within the ultra-high frequency band. In this latter mode of operation, the actuator knob 28 may select any of the broadcast channels from 14 to 83 and a corresponding numeral upon the UHF dial 18 will appear within the window 17. When it is desired to operate the tuner assembly 10 to receive the channels within the ultra-high frequency band, the selector knob 26 is rotated until the viewing section or window 17 and the letters UHF appears (i.e., the position shown in FIG. 1) within the window 14 of the escutcheon 12. In this position, appropriate circuitry will be operative to allow the UHF tuning unit 24 to function. As the actuator 28 is rotated, various numerals upon the UHF dial 18 will appear within the window 14 to thereby indicate that channel to which the television receiver is tuned.

Figure 3:
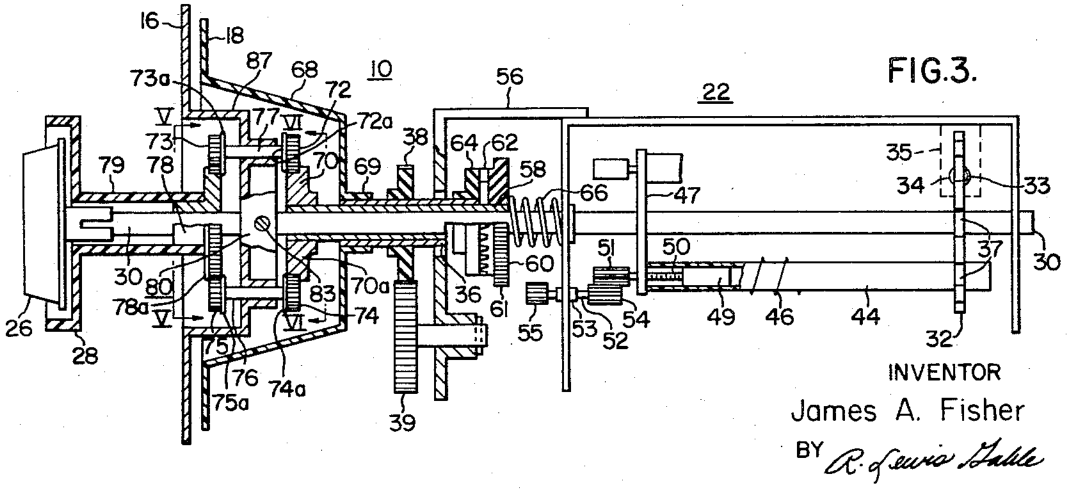
FIGS. 3 and 4 are side views in longitudinal section of the tuner assembly shown in FIG. 2.

Referring now particularly to FIG. 3, the structure and the operation of the VHF tuning unit 22 will be explained. Although the VHF tuning unit 22 is illustrated as a turret-type, it is apparent that other tuner assemblies, such as a switch-type tuner, may be employed in practicing the present invention. The VHF tuning unit 22 includes a metal enclosure 42 within which the necessary electrical and mechanical components for individually tuning the various broadcast channels within the very high frequency band are mounted. A large portion of the necessary tuner circuitry for receiving and converting a transmitted television signal to an IF signal, which is well known to those skilled in the art, has been deleted from these drawings for the sake of clarity. In order to provide individual selection of different broadcast channels, conventional turret tuning means is shown which may include a plurality of coil forms having inductances wound thereon. The coil forms are arranged for positioning an individual form, corresponding to the channel being tuned, in operative relation with the electrical circuits of this assembly. For the purposes of clarity, FIG. 3 illustrates only a single coil form 44, partially cut away, and having a coil 46 wound thereupon. It will be understood, however, that other coil forms having inductances wound thereon and necessary for providing tuning of other desired channels will also be provided. The coil 44 and other channel tuning inductances, not shown, are connected to the circuits by conventional means, not shown, such as sliding contact surfaces.

Means for individually positioning the different coil forms relative to the sliding contacts includes a selector shaft 30 mounted through the enclosure 42. Positioned upon the selector shaft 30 and secured by suitable means such as a pressfit or keyway to rotate therewith, are a rotating detent disk 32 and a support disk 47. The disks 32 and 47 have slots therein for mounting each of the coil forms, including the coil form 44. Thus, when the selector shaft 30 is rotated, different coil forms are individually and successively rotated into operative relationship with the sliding contacts.

A detent mechanism for securing the selector shaft 30 and consequently the coil form 44 (or any other coil form) is provided. The detent mechanism, as shown in dotted line in FIG. 3, includes a flexible plate 35 having an opening 33 therein and a ball 34 disposed within the opening 33 and flexibly biased as by the member 35 to be disposed within one of a plurality of notches 37 within the detent disk 32. There are thirteen notches 37, twelve of which correspond to the 12 VHF television channels and a single notch for the UHF tuning function. When the ball 34 is positioned within a notch 37, the selector shaft 30 is secured in a fixed position by detent action. When a rotational force is applied to the selector shaft 30, the force exerted by the flexible member 35 may be overcome and the detent disk 32 may be rotated to a succeeding notch.

In order to provide fine tuning for each of the VHF broadcast channels, an adjustable electrical impedance is provided in the VHF tuning unit 22 comprising a fine tuning slug 49 of a suitable ferromagnetic material, as shown in a cutaway portion of the coil form 44 in FIG. 3, and the associated coil 46. By altering the position of the slug 49 with relation to the coil 46, the electrical inductance of the coil may be correspondingly changed thereby providing an adjustable electrical quantity for fine tuning the VHF tuning unit 22. The fine tuning slug 49 is mounted upon a threaded shaft 50 which is disposed through a threaded aperture within the support disk 47. By rotating the shaft 50 upon its axis, the longitudinal position of the shaft 50 and the fine tuning slug 49 relative to the coil 46 may be varied. Suitable friction means such as a gear 51 is attached to one end of the shaft 50 for providing a means of applying a rotational force to the shaft 50. Further, a rotation force may be provided through the enclosure 42 by a shaft 52 which is mounted upon a bearing 53 within the enclosure 42. Upon either end of the shaft 52 there are mounted gears 55 and 54. As shown in FIG. 3, the gear 54 is disposed in a coupling relationship with the gear 51 to thereby impart a rotational motion to the shaft 50. It may be understood that a similar gear is associated with each of the slugs and coil forms and that the shaft 30 may be so located to bring these gears into a coupling relationship with the gear 54. Thus, it may be seen that each of the slugs associated with the coil forms and coils may be adjusted to achieve a fine tune with its associated broadcast channel. Further, the adjustment of one slug does not effect the adjustment of the remaining slugs whereby it is unnecessary to further alter the fine tuning of the desired channel when the shaft 30 is rotated to a different channel tuning position. As will be explained later with regard to FIG. 4, a rotational force applied to the actuator knob 28 may be transmitted to the gear 55 to thereby impart a change in longitudinal position of the fine tuning slug 49.

Referring more particularly to the subject of the present invention, linkage means are provided for interconnecting the actuator knob 28 to the fine tuning slugs 49 and also to select the various broadcast channels of the UHF tuning unit 24. As shown in FIG. 3, the actuator knob 28 has a cylindrical shaft portion 79 secured thereto which is concentrically disposed about the selector shaft 30. The shaft portion 79 is securely connected to a sun gear 78 disposed concentrically about the selector shaft 30. A hub or linkage assembly 80 is disposed so as to transmit the rotational force applied to the actuator knob 26 through the VHF indicator dial 16, which is secured upon the selector shaft 30 to be rotationally moved therewith. Specifically, the linkage assembly 80 has an opening centrally disposed therethrough to receive the selector shaft 30. The linkage assembly 80 is directly secured as by a set screw 83 to the selector shaft 30 to angularly rotate therewith when a rotational force is applied to the selector knob 26. Further, a pair of bearing openings (one of which is designated 85) are disposed at equal radial distances from the centrally oriented shaft 30. Disposed within the bearing openings are a pair of gear shafts 76 and 77. As will be explained later, the gear shafts 76 and 77 are of a length in excess of that of the bearing openings. A pair of planetary gears 72 and 73 are secured to either end of the shaft 77. In a similar manner, a pair of planetary gears 74 and 75 are secured to either end of the gear shaft 76. The planetary gears 75 and 73 are so spaced from the selector shaft 30 so that the teeth thereof engage the teeth of the sun gear 78.

A second sun gear 70 is disposed concentrically about the selector shaft 30 and is rotationally secured to a cylindrical, coupling drive shaft 58 which is likewise disposed concentrically about the selector shaft 30. The sun gear 70 is of such a diameter that the teeth thereof effectively engage the teeth of the planetary gears 72 and 74.

The other end of the coupling drive shaft 58 is rotationally secured to a coupling member 60. The coupling member 60 includes a gear portion 61 having a plurality of teeth disposed upon the periphery thereof, and a clutch portion 62 having a plurality or radially disposed teeth thereon. As will be explained later, the coupling drive shaft 58 and the coupling member 60 may be positioned so that the teeth of the gear portion 61 will engage the teeth of the gear 55. As shown in FIG. 3, a spring biasing member 66 is disposed between one side of the enclosure 42 and a surface of the coupling member 60 to thereby exert thereon a force along a path parallel to the shaft 30. Due to the biasing action of the member 66, the member 60, the drive shaft 58, the linkage assembly and the actuator knob 28 are disposed in a position to the left as seen in FIG. 3. Further, each of the planetary gears 72, 73, 74 and 75 has, respectively, a lip or radial surface portion *72a, 73a, 74a* and *75a* extending radially from the axis thereof a greater distance thant that of the gear teeth. In a similar manner, the sun gears 78 and 70, respectively, have lip portions *78a* and *70a* which radially extend a greater distance than the teeth portion associated with the sun gears. As shown in FIG. 3, the lip portion *70a* of the sun gear 70 exerts a force on both of the planetary gears 72 and 74. In turn, the lip portions *75a* and *73a* of the planetary gears 75 and 73, respectively, exert a force upon the sun gear 78. Through the use of these lip portions associated with the gears, the axial force exerted by the spring biasing member 66 may be exerted through the coupling drive shaft 58 to the actuator knob 28 and thereby position this drive train to the left as seen in FIG. 3.

A cylindrically shaped outer drive shaft 36 is concentrically disposed about the coupling drive shaft 58 and the selector shaft 30. At the end of the outer drive shaft 36 disposed towards the VHF tuning unit 22, a clutch member 64 is securely attached to rotate therewith. The clutch member 64 has a plurality of radially disposed teeth which are adapted to engage the teeth of the clutch portion 62 of the coupling member 60. A shielding bracket 56 is attached by any suitable means known in the art to the metal enclosure 42, and extends over the coupling member 60 and the clutch member 64 to protect these elements from dust, and to provide a mounting surface for the shafts extending therethrough. Further, there is an opening within the shielding bracket 56 through which the drive shafts 30, 58 and 36 extend. A gear 38 is disposed about and is secured to the outer drive shaft 36 to be rotatable therewith. As shown in FIG. 2, the teeth of the gear 38 frictionally engage the teeth of an intermediate gear 39, which in turn engage the teeth of a gear 40. The gear 40 is in turn connected as through a drive shaft 41 to the inner mechanism of the UHF tuning unit 24 to thereby control the selection of the broadcast channels within this frequency band. Thus, referring to FIGURE 3, a broadcast channel within the ultra-high frequency band may be selected by rotating the actuator knob 28, which in turn imparts a rotational force to the sun gear 78. The rotational motion is transferred through the planetary gears 72 and 73, and 74 and 75 to the sun gear 70; the sun gear 70 is connected through the coupling drive shaft 58 to the coupling member 60. The coupling member 60 is engaged under the force of the spring biasing member 66 to engage the clutch member 64 which in turn imparts the rotational motion to the gear 38 through the outer drive shaft 36. As shown in FIG. 2, the rotational motion of the gear 38 is imparted to the drive shaft 41 of the UHF tuning unit 24 by the gears 39 and 40 successively. It is noted that the selector shaft 30 is held in a fixed position under the action of the detent 35 while the actuator knob 28, the sun gears, the planetary gears and the shafts 36 and 58 are being rotated. Thus, a different channel within the UHF frequency band may be selected by rotating the knob 28 without effecting a change of the channel to which the unit 22 is tuned.

Further, the indicator dial 18 is secured to the outer drive shaft 36 to be rotatable therewith. The indicator dial 18 has a series of indicia thereon corresponding to the broadcast channels within the ultra-high frequency band. The indicator dial 18 is illustratively secured as by a conically shaped support member 68 to a flange portion 69 which is attached to the outer drive shaft 36. Thus, as the outer drive shaft 36 is rotated and the gear 38 is driven to thereby drive the shaft 41 associated with the UHF tuning unit 24, the indicator dialing 18 is correspondingly rotated. Referring to FIG. 1, the numerals displayed upon indicator dial 18 are displayed within the window 14; thus, as the indicator dial 18 is rotated, a numeral corresponding to the channel to which the UHF tuner 24 is adjusted will appear through the window 17 and the window 14 within the escutcheon 12.

Figures 5, 6, 7:
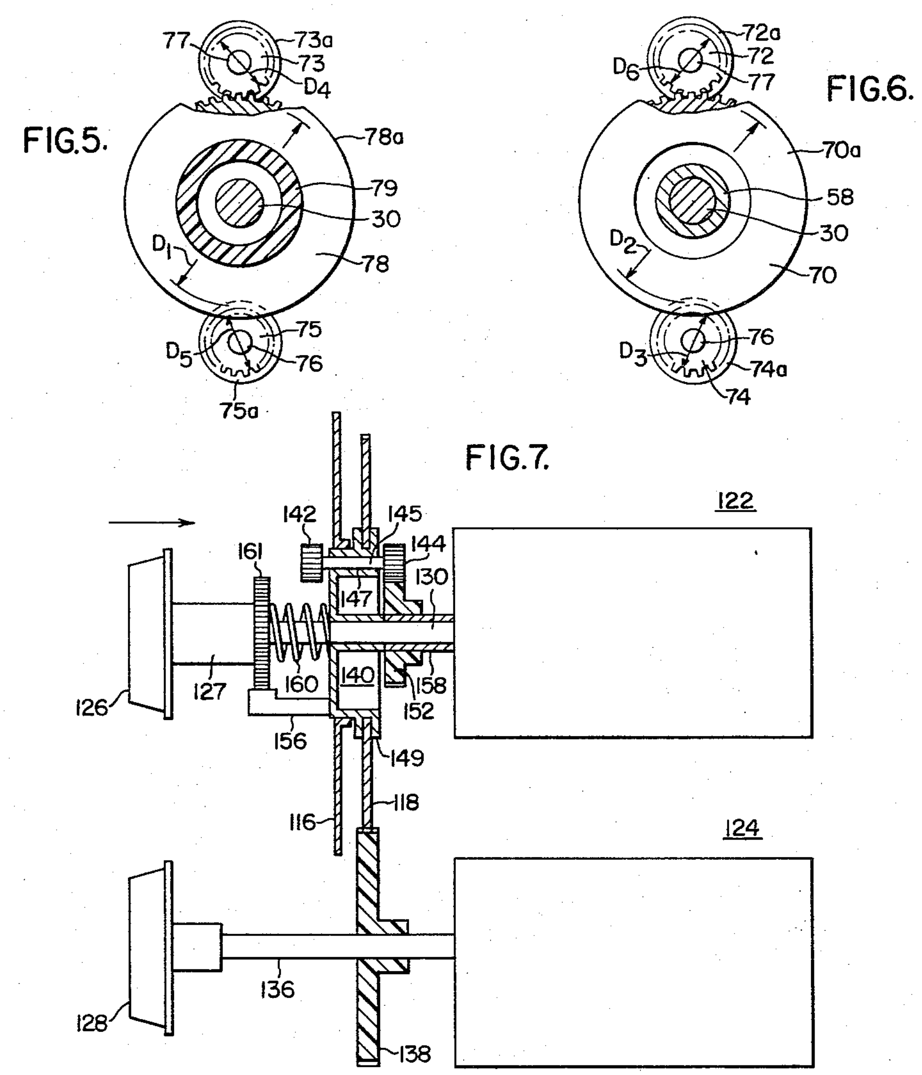
FIG. 5 is a sectional view of the gear mechanism of the tuner assembly as taken along line V—V of the tuner assembly of FIG. 3.
FIG. 6 is a sectional view of the gear mechanism of the tuner assembly as taken along line VI—VI of the tuner assembly of FIG. 3.
FIG. 7 is an alternative embodiment of the tuner assembly in accordance with the teachings of this invention.

As shown in FIG. 3, the indicator dial 16 is mounted through a cylindrically shaped support portion 87 upon the linkage assembly 80. As described above, the linkage assembly 80 is directly secured to the cylindrical shaft 30; thus, when the selector shaft 30 is rotated as by the knob 26, the linkage assembly 80 and the indicator dial 16 will rotated therewith. As shown in FIG. 1, the indicator dial 16 has a plurality of numerals thereon corresponding to the broadcast channels within the very high frequency band, which numerals are displayed through the viewing section or window 14. One of the principal objects of this invention is to provide a tuner assembly wherein the indicator dial for the broadcast channels within the very high frequency band may be simply and directly secured to the driver selector shaft 30 which is in turn coupled to the VHF tuning unit 22 for selecting the channels within this frequency band. Further, it is necessary that the rotating forces associated with the other functions of the tuner assembly also be mechanically linked from the knobs disposed in front of the indicator dial to the various components of the assembly disposed upon the rear of this indicator dial without effecting the position of the selector shaft 30. In order to best explain an illustrative mechanism for accomplishing this purpose, reference is now made to FIGS. 5 and 6 wherein there is shown the planetary gears 73 and 75, and 72 and 74 which are concentrically disposed about the selector shaft 30 so that the teeth of the respective planetary gears effectively mesh with the teeth of the sun gears 78 and 70. When a rotating force is applied to the selector knob 26, the shaft 30 and the linkage assembly 80 will be rotated. It is an important object of this invention that the selector shaft 30 may be rotated without effecting the position of the actuator knob 28, or the coupling drive shaft 58 or the other elements of the tuner assembly which are controlled and adjusted thereby. In FIG. 5, the teeth of the sun gear 78 are shown to have an effective pitch circle of diameter $D_1$. The terminology, pitch circle, in the context of this invention, is used to indicate that circular frictional surface which could be used to replace the gear as illustratively shown in the drawings. Referring to FIG. 6, the sun gear 70 has a plurality of teeth disposed upon a pitch circle with a diameter $D_2$. In accordance with the teachings of this invention, the pitch circle of the sun gears 70 and 78 are substantially equal to each other. Further, the corresponding planetary gears which are interconnected by a common shaft have pitch circles of diameters which are substantially equal to each other. As shown in FIGS. 5 and 6, the planetary gear 73 has a pitch circle with a diameter $D_4$ which is substantially equal to the diameter $D_6$ of the pitch circle of the planetary gear 72. In a similar fashion, the planetary gear 75 has a pitch circle with a diameter $D_5$ which is substantially equal to the diameter $D_3$ of the pitch circle of the planetary gear 74. It is noted that one pair of the planetary gears associated with the sun gears 70 and 78 could be dispensed with without effecting the operation of the tuner assembly 10. Since the sun gears 70 and 78, respectively, have teeth disposed about pitch circles of equal diameter, the planetary gears 73 and 72, and 75 and 74 may be rotated about the cylinder shaft 30 without rotating either of the sun gears 70 or 78. This may be more fully understood by noting that the planetary gears will rotate about the interconnecting shafts due to the engagement of their teeth with the teeth of he sun gears and that the tangential velocity of the teeth of the planetary gears 73 and 75 is respectively equal to that velocity of the teeth of the gears 72 and 74. Further, since the tangential velocity at the planetary gears which are interconnected with each other are equal, there will be no relative velocity between the teeth of the sun gears 78 and 70. As a result, the sun gears 70 and 78 will remain in the same relationship with each other while allowing a rotational force to be transmitted by the cylinder shaft 30 through the linkage assembly 80 and the indicator dial 16 without disturbing the relative position of the actuator knob 28, and the shafts 36 and 58 connected thereto.

Figure 4:
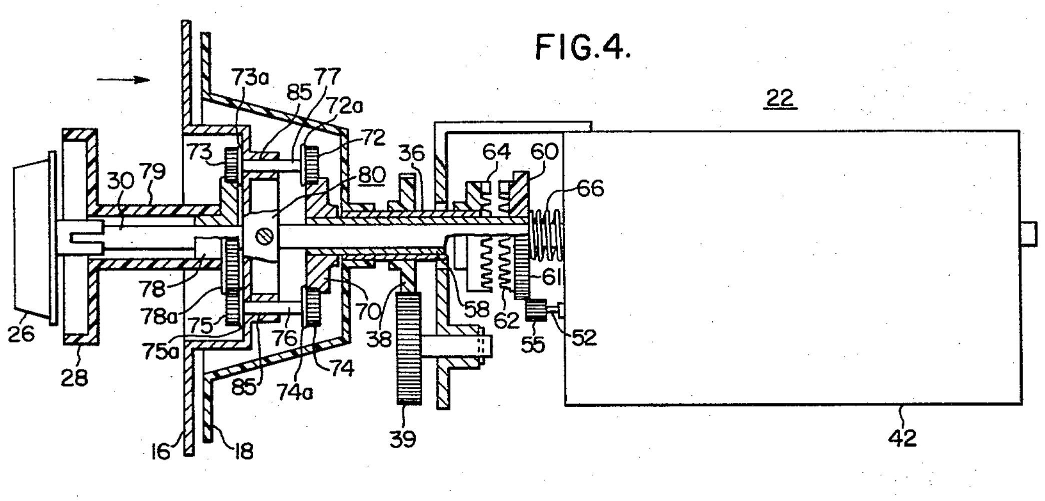

Referring now to FIG. 4, the operation of the tuner assembly 10 to achieve a fine tuning of the slugs 49 of the VHF tuning unit 22 will now be explained. First, the actuator knob 28 is depressed in the direction as indicated by the arrow in FIG. 4. This motion is in turn imparted to the sun gear 78 which exerts a force by the lip portion 78*a* simultaneously to the planetary gears 73 and 75. The planetary gears 73 and 75 in turn direct the force through the interconnecting shafts 76 and 77, and the planetary gears 72 and 74 to the sun gear 70. As seen in FIG. 4, each of the planetary gears 72 and 74 have lip portions 72*a* and 74*a*, respectively, which act against the forward edge of the sun gear 70. Further, the sun gear 70 imparts the axial motion along the coupling drive shaft 58 to thereby depress the spring biasing member 66, and also to disengage the clutch portion 62 of the coupling member 60 from the clutch member 64. As the coupling member 60 is moved in the axial direction to the right as seen in FIG. 4, the teeth of the gear portion 61 mesh with the teeth of the gear 55. Thus, when a rotational force is impressed upon the actuator knob 28, this motion will be transmitted through the aforementioned sun gears and planetary gears along the shaft 58 to thereby impart the rotational motion to the gear 55. As explained above, the rotational force applied to the gear 55 in turn imparts a change in the longitudinal position of the slug 49 to thereby adjust the fine tuning of the VHF tuner unit 22. It is particularly noted that the relative, axial motion of the coupling member 60 is achieved by making the interconnecting shafts 76 and 77 between the sun gears of a greater length than the bearing openings 85. Thus, a single mechanism such as the actuator knob 28 may be used to operate two different functions of the tuner assembly 10, i.e., the adjustment of the fine tuning of the VHF tuning unit 22 and the selection of the broadcast channel of the UHF tuner unit 24.

Referring now to FIGURE 7, an alternative embodiment of the tuner assembly of this invention will be explained. The tuner assembly of this embodiment includes a VHF tuning unit 122 and a UHF tuning unit 124. Selection of the broadcast channels of the ultra-high frequency band may be achieved by a UHF tuning knob 128 which is secured to a tuning shaft 136 so as to rotate therewith. The tuning shaft 136 is connected with the mechanism of the UHF tuning unit 124 to effect a change in the broadcast channels of this frequency band. Further, a gear 138 is disposed about and is secured to the tuning shaft 136 to rotate therewith; in addition, the gear 138 has teeth which are in engagement with the teeth upon the periphery of a UHF indicator dial 118. Thus, as a selector force is applied to the knob 128, the shaft 136 and the gear 138 will be rotated to thereby effect a rotational motion of the UHF dial 118. It may be understood that a plurality of numerals corresponding to the broadcast channels within the ultra-high frequency band are disposed upon the surface of the dial 118.

Referring now more specifically to the contribution of the embodiment shown in FIG. 7, a broadcast channel within the very high frequency band may be selected by imparting a rotational force to a VHF tuning knob 126. The knob 126 is secured to a cylindrical, shaft portion 127 to rotate therewith. The shaft portion 127 has a sun gear portion 161 with a plurality of teeth disposed thereon. As shown in FIG. 7, the teeth of the gear portion 161 are in engagement with a detent 156 which is secured to a hub or linkage assembly 140 so as to rotate therewith. In turn, the linkage assembly 140 is disposed about and secured to a VHF tuning shaft 130 to be rotatable therewith. Thus, when a rotating force is applied to the knob 126, the force is applied through the shaft portion 127, the detent 156, and the linkage assembly 140 to the shaft 130 which in turn effects a changing of the channel within the very high frequency band.

In a second mode of operation, the knob 126 may be depressed by moving the knob 126 in a direction axially of the shaft 130 to the right as indicated by the arrow in FIG. 7. In this depressed position, a spring biasing member 160 which is disposed about the shaft 130 between the sun gear portion 161 and the linkage assembly 140 is compressed, and the sun gear portion 161 is disengaged from the detent 156. As the knob 126 is pressed further to the right as shown in FIG. 7, the teeth of the sun gear portion 161 are brought into engagement with the teeth of a planetary gear 142. The linkage assembly 140 includes a bearing opening 147 therein through which a shaft 145 is inserted to interconnect the planetary gear 142 to a second planetary gear 144. Further, a sun gear 152 is concentrically disposed about the tuning shaft 130 and is secured to a coupling drive shaft 158 so as to rotate therewith. The coupling drive shaft 158 is of a cylindrical configuration and is disposed concentrically about the shaft 130. Illustratively, the coupling shaft 158 may serve to effect an adjustment of the fine tuning of the channels of the very high frequency band. An indicator dial 116 is provided with a series of numerals thereon corresponding to the broadcast channels within the very high frequency band. In a manner similar to that shown in FIG. 1, the indicator dial 116 has a window or viewing portion (not shown) therein through which the numerals upon the indicator dial 118 may be viewed. In accordance with the teachings of the present invention, the VHF indicating dial 116 is secured and mounted upon the linkage assembly 140 and is rotatable with the assembly 140 and the shaft 130. Further, the indicator dial 118 is rotatably supported upon the linkage assembly 140 by a pair of protrusions 149 which are disposed on either side of the dial 118 upon the outer periphery of the hub assembly 140. In accordance with the teachings of this invention, the diameter of the pitch circle of the teeth of the sun portion 161 is equal to the diameter of the pitch circle of the teeth of the sun gear 152. Further, the diameters of the pitch circle of the teeth of the planetary gears 142 and 144 are substantially equal to each other. Thus, when a rotational force is imparted to the hub assembly as by the knob 126 and the detent 156, and a rotational motion is imparted to the planetary gears 142 and 144 about the shaft 130, substantially the same tangential velocity will be applied to the sun gears 154 and 152; as a result, the relative motion of the sun gears will be maintained. Thus, the changing of a channel within the very high frequency band may be effected by the rotation of the shaft 130 without effecting the fine tuning of the broadcast channel which is controlled by the coupling shaft 158.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

What is claimed is:

1. A tuner assembly for television receivers or the like comprising a first tuning unit for tuning said television receiver in a first frequency band, a first drive shaft operatively connected to said first tuning unit, a second tuning unit for tuning said television receiver in a second frequency band, a first indicator dial having indicia thereon designating the channels in said first frequency band, a second indicator dial having indicia thereon designating the channels in said second frequency band, a second drive shaft disposed about said first drive shaft and operatively connectable to fine tuning means in said first tuning unit, drive means for coupling a rotational force to said second drive shaft, said drive means supporting said first indicator dial and being adapted for continuous engagement with said first drive shaft and for maintaining said second drive shaft in a preselected position when said first drive shaft is rotated said first indicator dial having a viewing portion therein disposed so that selected indicia upon said second indicator dial are viewable therethrough, said second indicator dial being operatively connected to said tuning unit, and means for driving said second tuning unit.

2. A tuner assembly as claimed in claim 1, wherein said drive means includes a gear train including first and second sun gears, said second sun gear connected to said second drive shaft to rotate therewith, and first and second planetary gears interconnected together for simultaneous rotation, said first sun gear having a pitch circle of a first diameter, said second sun gear having a pitch circle of a second diameter substantially equal to the first diameter, said first and second planetary gears engaging respectively said first and second sun gears.

3. A tuner assembly as claimed in claim 2, wherein said gear train includes a linkage assembly, said linkage assembly being directly connected to said first shaft to rotate therewith, said linkage assembly supporting said first indicator dial to rotate with said first shaft, said linkage assembly supporting said first and second planetary gears so as to rotate about said first drive shaft.

4. A tuner assembly as claimed in claim 3, wherein said first tuning unit is adapted for receiving the very high frequency band, said second tuning unit is adapted to receive the ultra-high frequency band, said first indicator dial having indicia thereon corresponding to the broadcast channels within the very high frequency band, and said second indicator dial having indicia thereon corresponding to the broadcast channels within said ultra-high frequency band.

5. A tuner assembly as claimed in claim 2 including a third drive shaft disposed about said second drive shaft, coupling means disposed between said second and third drive shafts for releasably transmitting rotational motion therebetween, said second indicator dial supported upon said third drive shaft to be rotatable therewith.

6. A tuner assembly as claimed in claim 2 further including a third drive shaft disposed about said second drive shaft, a fourth drive shaft, and coupling means for imparting rotational motion to said third and fourth driving shafts, said coupling means having a first means for interconnecting rotational motion between said second drive shaft and said third drive shaft and a second means for interconnecting rotational motion between said second drive shaft and said fourth drive shaft.

7. A tuner assembly as claimed in claim 6, wherein said drive means further includes a linkage assembly, said linkage assembly disposed upon said first drive shaft so as to rotate therewith, said first and second planetary gears being interconnected by a shaft, said linkage assembly having a support surface for said shaft of a length less than that of said shaft to thereby allow said planetary gears to be repositioned, and spring means for biasing said coupling means so that said first means is operative to interconnect said second and third drive shafts.

8. A tuner assembly as claimed in claim 7, wherein said first sun gear and said first planetary gear each have radial surfaces for abutting each other, said second sun gear and said second planetary gear having radial surfaces thereon for abutting against each other, and knob means for imparting a rotational force through said first sun gear and for imparting a longitudinal motion against the action of said spring means.

9. A tuner assembly as claimed in claim 3 further including a dual purpose knob means, a detent means securely disposed upon said linkage assembly to be rotatable therewith, said knob means being secured to said first sun gear to be rotatable therewith, said first sun gear releasably engaging said detent means to thereby impart a rotational drive to said linkage assembly and said first drive shaft, said knob means being movable to a second position whereby said sun gear engages said first planetary gear to thereby impart a rotational motion to said first and second planetary gears, said second sun gear and said second drive shaft.

10. A tuner assembly as claimed in claim 9 further including a third drive shaft operatively connected to said second tuning unit, gear means disposed upon said third shaft to be rotated therewith, said gear means engaging said second indicator dial to thereby orientate the position of said second dial in accordance with the adjustment of said second tuning unit.

References Cited

UNITED STATES PATENTS

| | | | |
|---|---|---|---|
| 2,773,390 | 12/1956 | Oeler | 74—10.45 |
| 2,788,668 | 4/1957 | Sperber | 74—10.45 |

MILTON KAUFMAN, *Primary Examiner.*